(12) United States Patent
Shi et al.

(10) Patent No.: US 8,185,140 B2
(45) Date of Patent: May 22, 2012

(54) METHODS AND APPARATUS FOR SUPPORTING SHORT BURST MESSAGES OVER WIRELESS COMMUNICATION NETWORKS

(75) Inventors: Guangming Carl Shi, San Diego, CA (US); Tom Chin, San Diego, CA (US); Kuo-Chun Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 629 days.

(21) Appl. No.: 12/246,469

(22) Filed: Oct. 6, 2008

(65) Prior Publication Data

US 2010/0087212 A1 Apr. 8, 2010

(51) Int. Cl.
*H04W 4/00* (2009.01)
(52) U.S. Cl. ......................... 455/466; 370/352
(58) Field of Classification Search .................. None
See application file for complete search history.

(56) References Cited

U.S. PATENT DOCUMENTS

| | | | | |
|---|---|---|---|---|
| 2004/0085949 | A1* | 5/2004 | Partanen et al. | 370/352 |
| 2007/0223491 | A1* | 9/2007 | Baek et al. | 370/395.21 |
| 2009/0109978 | A1* | 4/2009 | Zhu et al. | 370/395.52 |

OTHER PUBLICATIONS

Hang Zhang et al: "Title Support of Short Data Burst Transmission to/from an MSS in Sleep Mode or Idle Mode"Internet Citation Nov. 4, 2004, XP003001673.
International Preliminary Report on Patentability—PCT/US2009/058847, The International Bureau of WIPO—Geneva, Switzerland, Jan. 13, 2011.
International Search Report and Written Opinion—PCT/US2009/058847, International Search Authority—European Patent Office—Feb. 5, 2010.
Manning S., et al., "A short data burst mechanism for third generation CDMA wireless packet data" Vehicular Technology Conference, 1999 IEEE 49th Houston, TX, USA May 16-20, 1999, Piscataway, NJ, USA, IEEE, US, vol. 1, May 16, 1999, pp. 521-525, XP010342025 ISBN: 978-0-7803-5565-1, pp. 522-523.

* cited by examiner

*Primary Examiner* — Erika Gary
(74) *Attorney, Agent, or Firm* — Paul Kuo; Tyler J. Overall

(57) ABSTRACT

In accordance with a method for supporting short burst messages over a wireless communication network, mobile-originated short burst messages may be sent using at least one of a message-based approach and a service flow-based approach. Also, mobile-terminated short burst messages may be received using at least one of the message-based approach and the service flow-based approach.

25 Claims, 7 Drawing Sheets

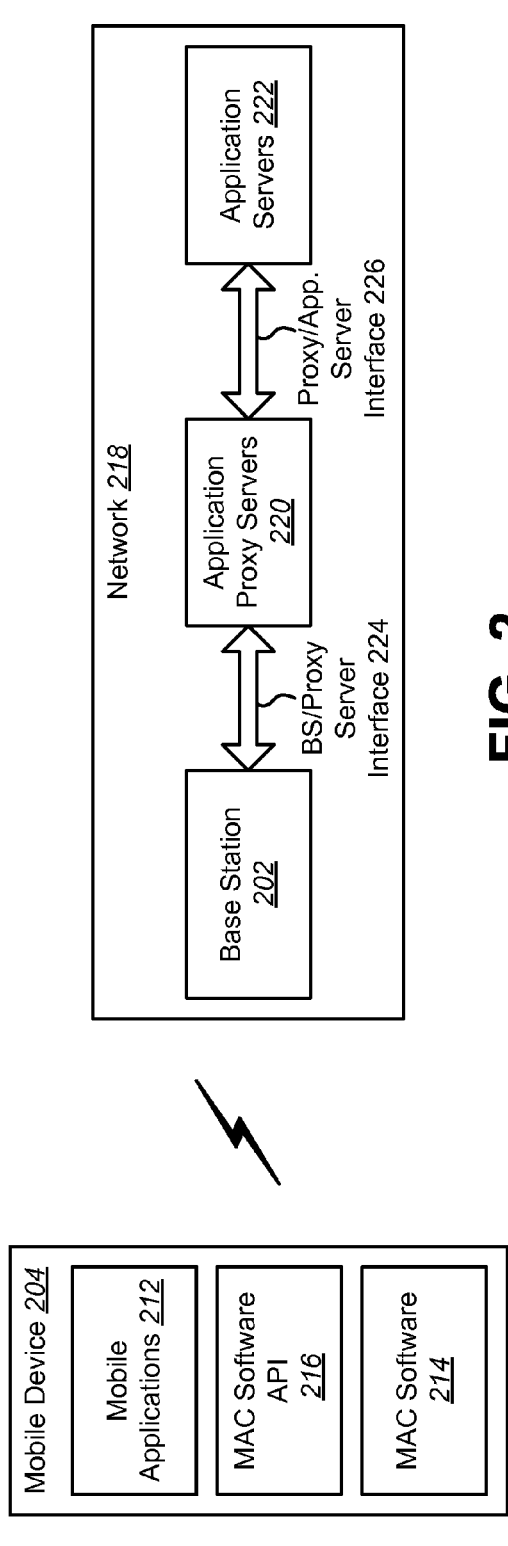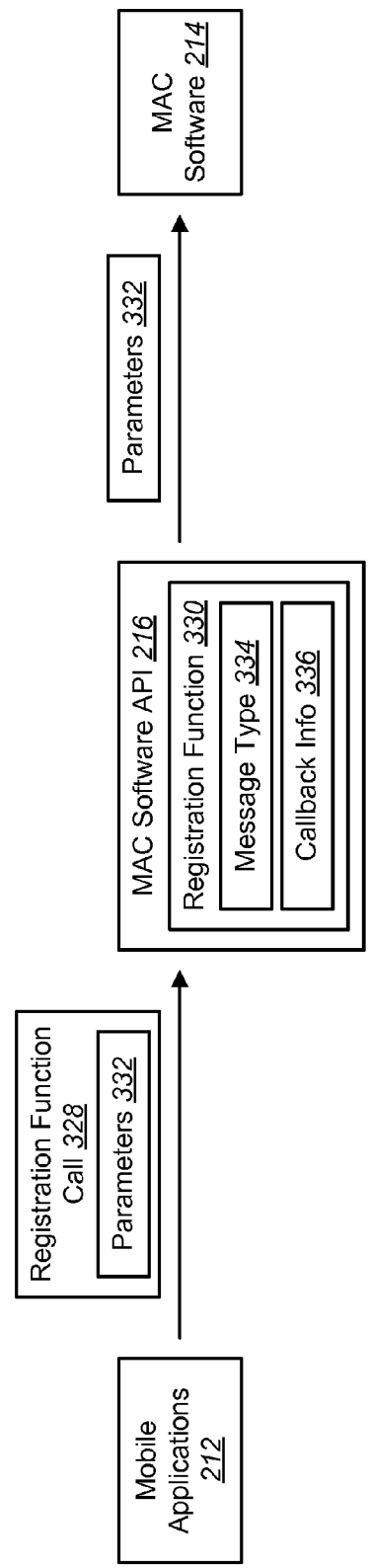

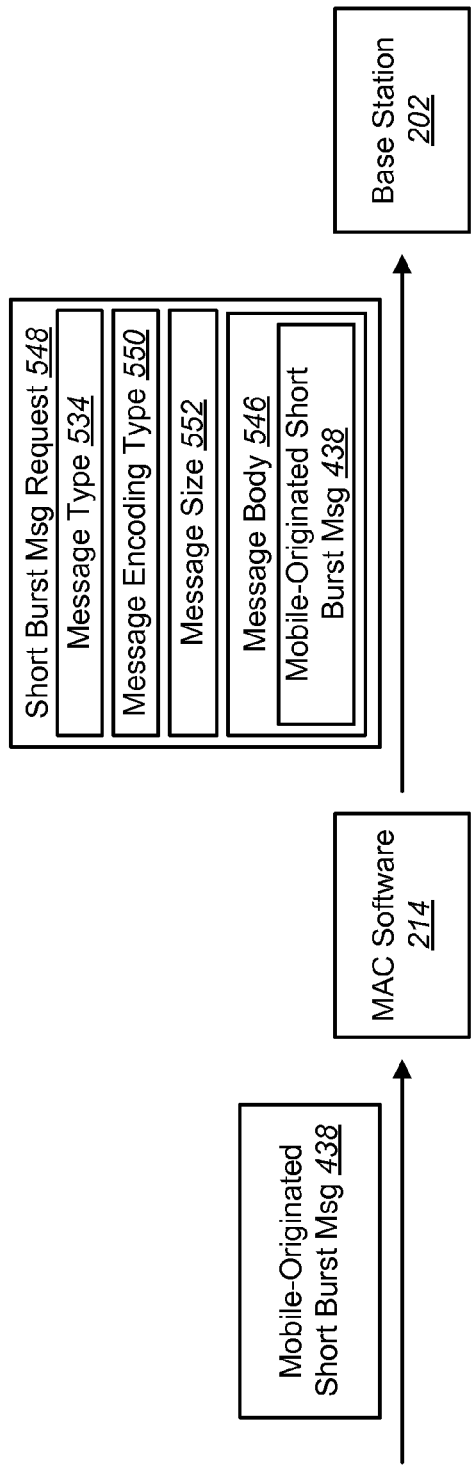
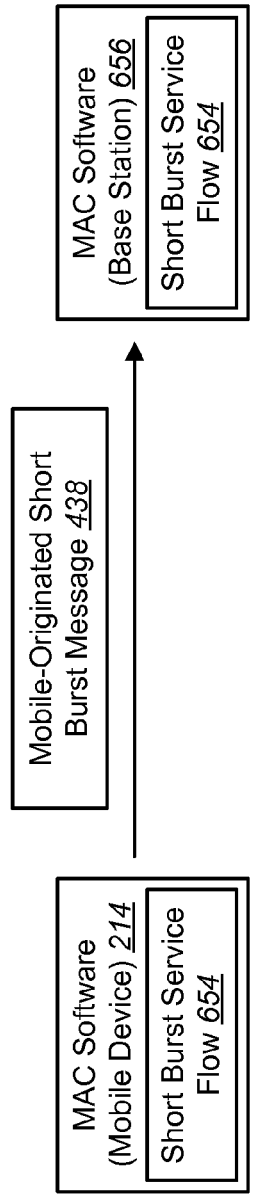
FIG. 5
FIG. 6

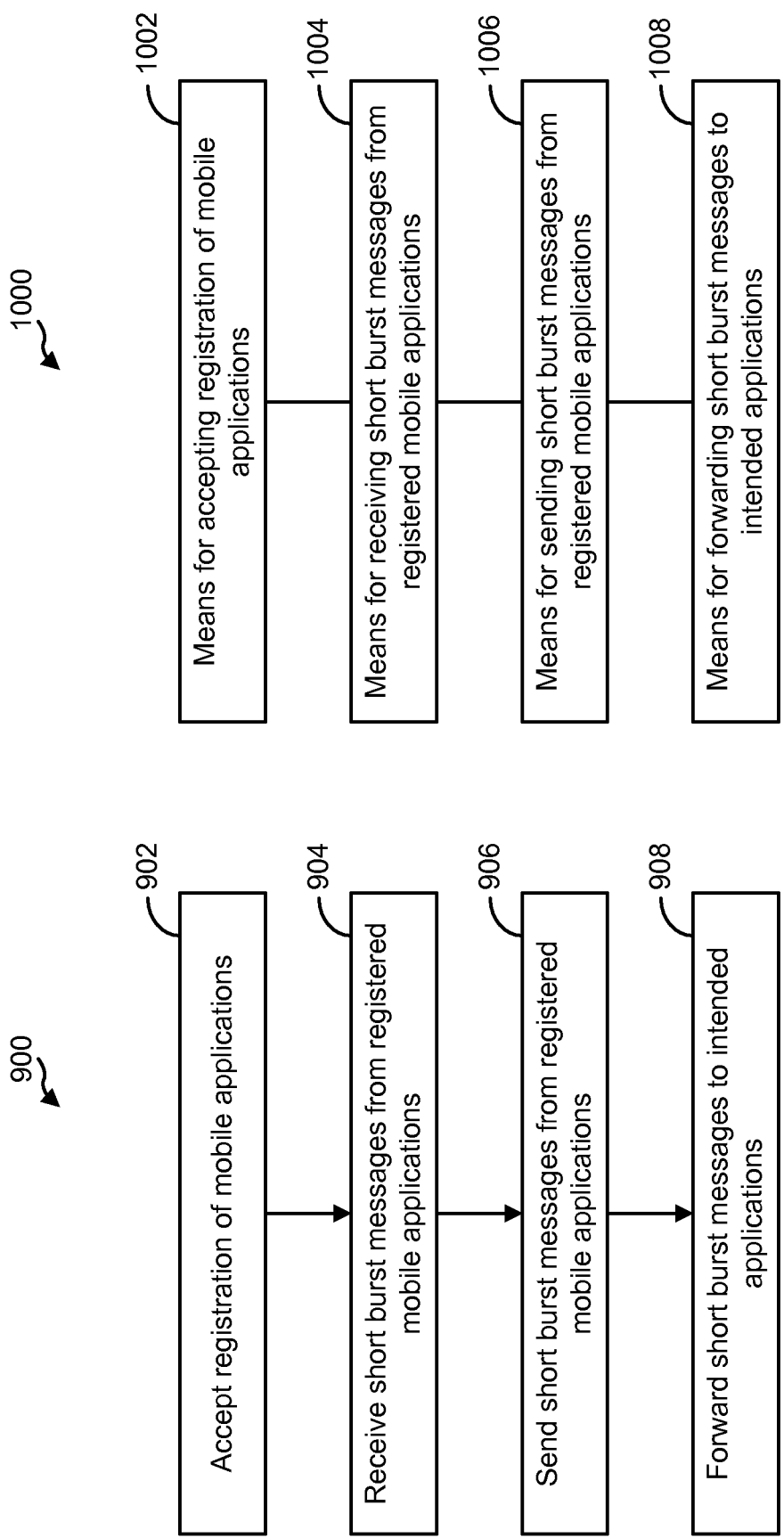

METHODS AND APPARATUS FOR SUPPORTING SHORT BURST MESSAGES OVER WIRELESS COMMUNICATION NETWORKS

TECHNICAL FIELD

The present disclosure relates generally to communication systems. More specifically, the present disclosure relates to methods and apparatus for supporting short burst messages over wireless communication networks.

BACKGROUND

As used herein, the term "mobile device" refers to an electronic device that may be used for voice and/or data communication over a wireless communication system/network. (The terms "system" and "network" may be used interchangeably herein.) Examples of mobile devices include cellular phones, personal digital assistants (PDAs), handheld devices, wireless modems, laptop computers, personal computers, etc. A mobile device may alternatively be referred to as a mobile station, an access terminal, a mobile terminal, a subscriber station, a remote station, a user terminal, a terminal, a subscriber unit, user equipment, etc.

A wireless communication network may provide communication for a number of mobile devices, each of which may be serviced by a base station. A base station may alternatively be referred to as an access point, a Node B, or some other terminology.

A mobile device may communicate with one or more base stations via transmissions on the uplink and the downlink. The uplink (or reverse link) refers to the communication link from the mobile device to the base station, and the downlink (or forward link) refers to the communication link from the base station to the mobile device.

The resources of a wireless communication network (e.g., bandwidth and transmit power) may be shared among multiple mobile devices. A variety of multiple access techniques are known, including code division multiple access (CDMA), time division multiple access (TDMA), frequency division multiple access (FDMA), orthogonal frequency division multiple access (OFDMA), single carrier frequency division multiple access (SC-FDMA), and so forth.

Benefits may be realized by improved methods and apparatus related to the operation of wireless communication networks.

BRIEF DESCRIPTION OF THE DRAWINGS

FIG. 2 illustrates a mobile device that is configured to support short burst messages over a wireless communication network;

FIG. 3 illustrates how a mobile application may register with media access control (MAC) software to send and receive short burst messages;

FIG. 5 illustrates how the MAC software may send a mobile-originated short burst message over a wireless communication network using the message-based approach;

FIG. 6 illustrates how the MAC software may send a mobile-originated short burst message over a wireless communication network using the service flow-based approach;

FIG. 9 illustrates a method for supporting short burst messages over wireless communication networks;

FIG. 10 illustrates means-plus-function blocks corresponding to the method of FIG. 9.

SUMMARY

Figure 1:
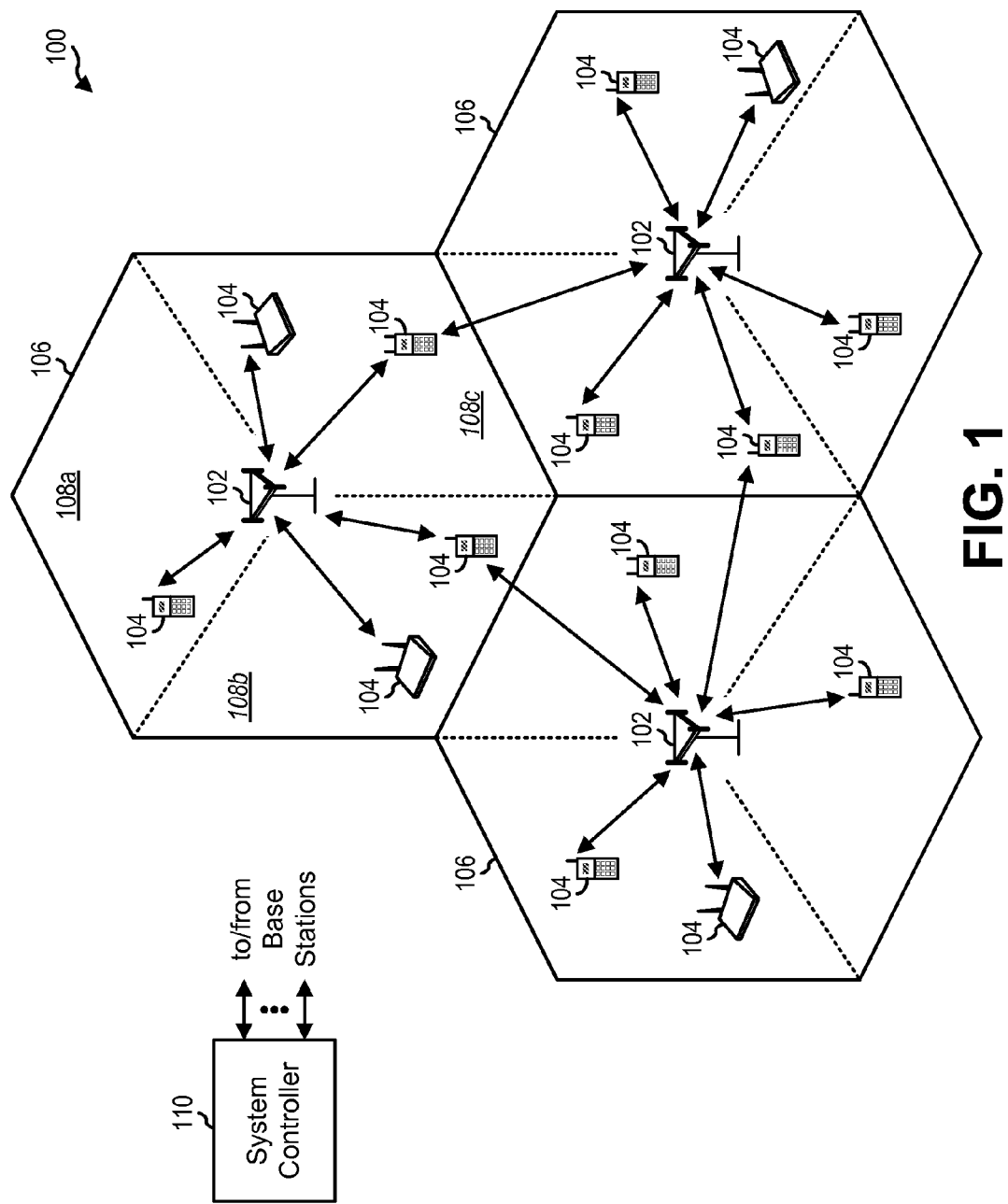
FIG. 1 illustrates a wireless communication system with multiple base stations and multiple mobile devices.

A method for a mobile device to support short burst messages is disclosed. The method may include determining whether mobile-originated short burst messages should be sent using a message-based approach or a service flow-based approach, and sending the mobile-originated short burst messages using at least one of the message-based approach and the service flow-based approach. The method may also include receiving mobile-terminated short burst messages using at least one of the message-based approach and the service flow-based approach.

A method for a base station to support short burst messages is disclosed. The method may include receiving mobile-originated short burst messages using at least one of a message-based approach and a service flow-based approach. The method may also include forwarding mobile-terminated short burst messages using at least one of the message-based approach and the service flow-based approach.

A mobile device configured for supporting short burst messages is disclosed. The mobile device may include a processor and memory in electronic communication with the processor. The mobile device may also include instructions stored in the memory. The instructions may be executable by the processor to determine whether mobile-originated short burst messages should be sent using a message-based approach or a service flow-based approach, and to send the mobile-originated short burst messages using at least one of the message-based approach and the service flow-based approach. The instructions may also be executable to receive mobile-terminated short burst messages using at least one of the message-based approach and the service flow-based approach.

A base station configured for supporting short burst messages is disclosed. The base station may include a processor and memory in electronic communication with the processor. The base station may also include instructions stored in the memory. The instructions may be executable by the processor to receive mobile-originated short burst messages using at least one of a message-based approach and a service flow-based approach. The instructions may also be executable to forward mobile-terminated short burst messages using at least one of the message-based approach and the service flow-based approach.

A mobile device configured for supporting short burst messages is disclosed. The mobile device may include means for determining whether mobile-originated short burst messages should be sent using a message-based approach or a service flow-based approach, and means for sending the mobile-originated short burst messages using at least one of the message-based approach and the service flow-based approach. The mobile device may also include means for receiving mobile-terminated short burst messages using at least one of the message-based approach and the service flow-based approach.

A base station configured for supporting short burst messages is disclosed. The base station may include means for receiving mobile-originated short burst messages using at least one of a message-based approach and a service flow-based approach. The base station may also include means for forwarding mobile-terminated short burst messages using at least one of the message-based approach and the service flow-based approach.

A computer-program product for facilitating support for short burst messages by a mobile device is disclosed. The computer-program product may include a computer-readable medium having instructions thereon. The instructions may include code for determining whether mobile-originated short burst messages should be sent using a message-based approach or a service flow-based approach, and code for sending the mobile-originated short burst messages using at least one of the message-based approach and the service flow-based approach. The instructions may also include code for receiving mobile-terminated short burst messages using at least one of the message-based approach and the service flow-based approach.

A computer-program product for facilitating support for short burst messages by a base station is disclosed. The computer-program product may include a computer-readable medium having instructions thereon. The instructions may include code for receiving mobile-originated short burst messages using at least one of a message-based approach and a service flow-based approach. The instructions may also include code for forwarding mobile-terminated short burst messages using at least one of the message-based approach and the service flow-based approach.

In certain embodiments, each of the above-described summaries can be configured for operation and/or use in a wireless communication network that supports an Institute of Electronic and Electrical Engineers (IEEE) 802.16 standard

DETAILED DESCRIPTION

The techniques described herein may be used for various communication systems such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

FIG. 1 shows a wireless communication system 100 with multiple base stations 102 and multiple mobile devices 104. A base station 102 is a station that communicates with the mobile devices 104. A base station 102 may also be called, and may contain some or all of the functionality of, an access point, a Node B, an evolved Node B, etc. Each base station 102 provides communication coverage for a particular geographic area 106. The term "cell" can refer to a base station 102 and/or its coverage area 106 depending on the context in which the term is used. To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Mobile devices 104 are typically dispersed throughout the system 100. A mobile device 104 may also be called, and may contain some or all of the functionality of, a mobile station, a terminal, an access terminal, a user equipment, a subscriber unit, a station, etc. A mobile device 104 may be a cellular phone, a personal digital assistant (PDA), a wireless device, a wireless modem, a handheld device, a laptop computer, etc. A mobile device 104 may communicate with zero, one, or multiple base stations 104 on the downlink (DL) and/or uplink (UL) at any given moment. The downlink (or forward link) refers to the communication link from the base stations 102 to the mobile devices 104, and the uplink (or reverse link) refers to the communication link from the mobile devices 104 to the base stations 102.

For a centralized architecture, a system controller 110 may couple to base stations 102 and provide coordination and control for these base stations 102. The system controller 110 may be a single network entity or a collection of network entities. For a distributed architecture, base stations 102 may communicate with one another as needed.

The present disclosure relates generally to data transmissions that occur in short bursts (i.e., at intermittent intervals) rather than in a continuous stream. Some examples of applications that typically transmit data in short bursts include Short Message Service (SMS) applications, Instant Messaging (IM) applications, Multimedia Messaging Service (MMS) applications, Session Initiation Protocol (SIP) applications, etc. These kinds of applications will be referred to herein as short burst applications. Messages that are sent by short burst applications will be referred to as short burst messages. Examples of short burst messages include SMS messages, instant messages, MMS messages, SIP messages, etc.

SMS is a communications protocol allowing the interchange of short text messages between mobile telephone devices. The SMS technology has facilitated the development and growth of text messaging. A significant number of mobile phone subscribers send and receive text messages on their phones. Many SMS messages are mobile-to-mobile text messages, although the SMS standard supports other types of broadcast messaging as well.

IM is a form of real-time communication between two or more people based on typed text. The text may be conveyed via computing devices that are connected over one or more networks, such as the Internet. IM allows effective and efficient communication, featuring immediate receipt of acknowledgment or reply. If IM is implemented in a mobile device, it may be referred to as mobile IM.

MMS is a standard for telephone messaging systems that allows sending messages that include multimedia objects (e.g., images, audio, video, rich text) and not just text as in SMS. Mobile devices with built-in or attached cameras, or with built-in MP3 players may have an MMS messaging client, i.e., a software program that interacts with the mobile subscriber to compose, address, send, receive, and view MMS messages.

SIP is a signaling protocol, widely used for setting up and tearing down multimedia communication sessions such as voice and video calls over the Internet. Other feasible application examples include video conferencing, streaming multimedia distribution, instant messaging, presence information and online games. SIP can be used for creating, modifying and terminating two-party (unicast) or multiparty (multicast) sessions consisting of one or several media streams.

The present disclosure proposes various techniques for supporting the transmission of short burst messages, such as the types of messages just described, over wireless communication networks. The techniques described herein may be implemented in WiMAX networks. The term "WiMAX" refers to a family of standards that is prepared by the Institute of Electronic and Electrical Engineers (IEEE) 802.16 Working Group on Broadband Wireless Access Standards. Thus, the term "WiMAX network" refers to a wireless communication network that is configured in accordance with one or more WiMAX standards. Current WiMAX standards do not indicate how short burst messages may be supported.

Two different approaches for supporting the transmission of short burst messages over wireless communication networks are described herein: a message-based approach, and a service flow-based approach.

The message-based approach involves the use of media access control (MAC) messages for sending and receiving short burst messages. The present disclosure proposes that two new MAC messages be defined: a short burst message request to send short burst messages, and a short burst message indication to receive short burst messages.

Another approach described herein involves the use of a service flow with a quality of service (QoS) that is specifically defined for short burst messages. This type of service flow will be referred to as a short burst service flow.

Thus, in accordance with the present disclosure, short burst applications on mobile devices may send and receive short burst messages using the message-based approach (i.e., by sending short burst message requests and receiving short burst message indications) and/or using the service flow-based approach (i.e., by establishing one or more short burst service flows). Advantageously, it can be transparent to the applications themselves whether the message-based approach or the service flow-based approach is used. Network software (e.g., MAC software) on the mobile device can determine which approach to use.

FIG. 2 illustrates a mobile device 204 that is configured to support short burst messages over a wireless communication network 218. The mobile device 204 includes one or more mobile applications 212 that typically transmit data in short bursts. These mobile applications 212 may include, for example, an SMS client, an IM client, an MMS client, an SIP client, etc. As indicated above, these types of applications may be referred to herein as short burst applications.

The mobile device 204 also includes media access control (MAC) software 214. The MAC software 214 may be configured to support the message-based approach and the service flow-based approach for sending and receiving short burst messages over the wireless communication network 218, as described herein.

More specifically, the MAC software 214 may be configured to accept registration of mobile applications 212 for sending and receiving short burst messages. The MAC software 214 may also be configured to send mobile-originated short burst messages (i.e., short burst messages that originate with a mobile application 212 on the mobile device 204) over the wireless communication network 218. These messages may be sent using the message-based approach and/or the service flow-based approach. The MAC software 214 may also be configured to forward mobile-terminated short burst messages (i.e., short burst messages that are destined for a mobile application 212 on the mobile device 204) to the intended mobile applications 212.

The mobile device 204 also includes a MAC software application programming interface (API) 216. The MAC software API 216 may function as an interface between the MAC software 214 and the mobile applications 212. Mobile applications 212 may register with the MAC software 214 via the MAC software API 216. Mobile-originated short burst messages may be sent from the mobile applications 212 to the MAC software 214 via the MAC software API 216. Mobile-terminated short burst messages may be forwarded from the MAC software 214 to the intended applications 212 via the MAC software API 216.

The mobile device 204 may communicate with a base station 202 within the network 218. The base station 202 may be configured to support the message-based approach and the service flow-based approach for sending and receiving short burst messages over the wireless communication network 218, as described herein.

The base station 202 may be in electronic communication with one or more application proxy servers 220, which may be in electronic communication with one or more application servers 222. Examples of application servers 222 include a Short Message Service Center (SMSC), a Multimedia Messaging Service Center (MMSC), an Instant Messaging Center (IMC), a Session Initiation Protocol Center (SIPC), etc.

An interface 224 between the base station 202 and the application proxy servers 220 may be provided, and an interface 226 between the application proxy servers 220 and the application servers 222 may also be provided. These interfaces 224, 226 may be configured to route mobile-originated messages to the intended application servers 222, and also to route server-originated messages to the intended mobile devices 204.

If the message-based approach described herein is used to send short burst messages, then the mobile device 204 and the base station 202 may exchange short burst message requests and short burst message indications (the two new MAC messages described herein). The base station 202 and the application proxy servers 220 may also exchange these messages. The application proxy servers 220 and the application servers 222 may also exchange these messages.

The wireless communication network 218 may be a WiMAX network. In this case, then the various components shown in FIG. 2 (e.g., the MAC software 214 on the mobile device 204, the base station 202, etc.) may be configured to support the features that are specified in WiMAX standards. Also, if the network 218 is a WiMAX network, then examples of application proxy servers 220 may include a WiMAX-SMSC, a WiMAX-MMSC, a WiMAX-IMC, a WiMAX-SIPC, etc.

FIG. 3 illustrates how a mobile application 212 may register with the MAC software 214 to send and receive short burst messages. The mobile application 212 may make a call 328 to a registration function 330 that is defined in the MAC software API 216. This registration function call 328 may include the parameters 332 that are defined for the registration function 330. These parameters 332 may include the message type 334, the message callback information 336, etc. The MAC software API 216 may then forward the parameters 332 of the registration function call 328 to the MAC software 214.

Figure 4:
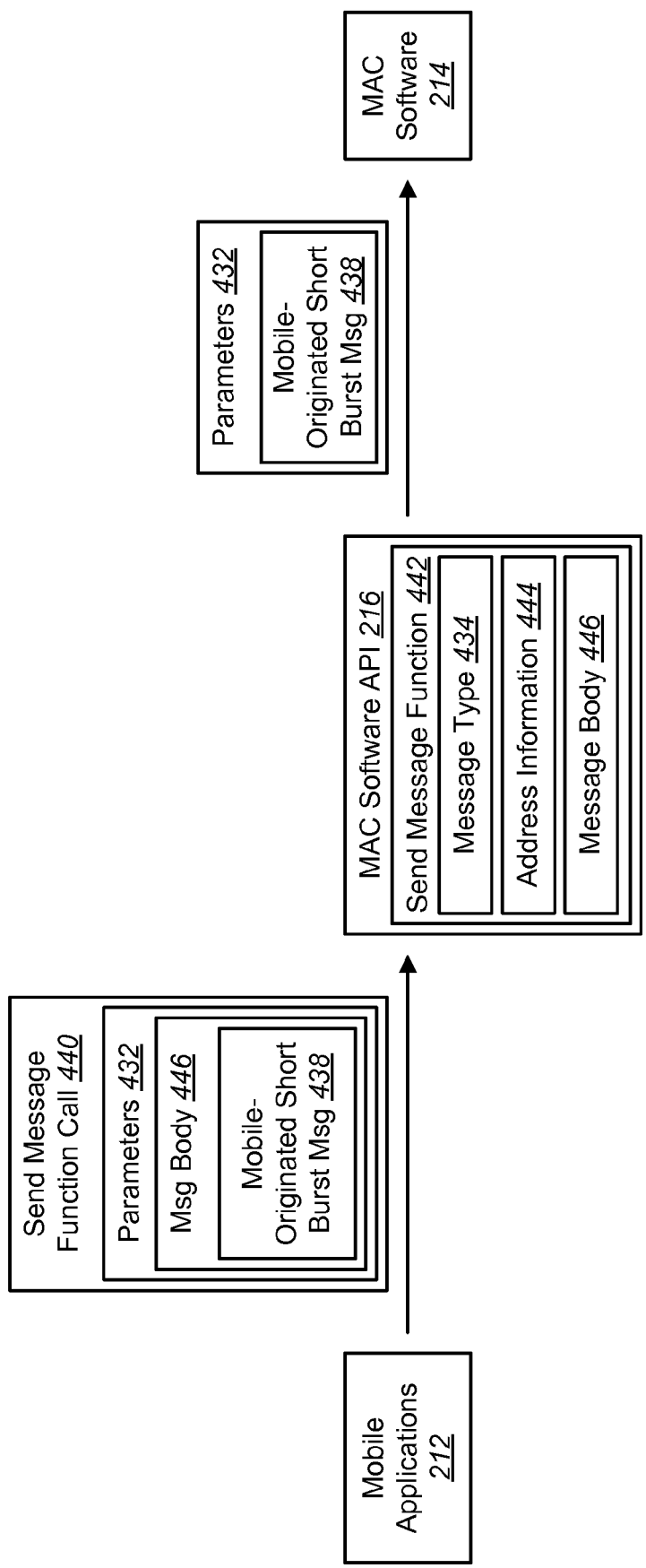
FIG. 4 illustrates how the MAC software may receive a mobile-originated short burst message from a mobile application.

FIG. 4 illustrates how the MAC software 214 may receive a mobile-originated short burst message 438 from a mobile application 212. The mobile application 212 may make a call 440 to a send message function 442 that is defined in the MAC software API 216. This send message function call 440 may include the parameters 432 that are defined for the send message function 442. These parameters 432 may include the message type 434, address information 444, the message body 446, etc. The mobile-originated short burst message 438 may be included in the message body 446. The MAC software API 216 may then forward the parameters 432 of the send message function call 440, including the mobile-originated short burst message 438, to the MAC software 214.

An example of a send message function call 440 is:
WiMAX_Send_Msg(SMS, SMS_SUBMIT, smscenter@smsserver.com, 18586668888, "hello world")

In this example, the message type 434 is SMS, and more particularly, SMS_SUBMIT. The address information 444 includes an email address and a telephone number. The message body 446 includes the phrase "hello world", which is the mobile-originated short burst message 438 that is being sent.

When the MAC software 214 receives a mobile-originated short burst message 438 from an application 212, the MAC software 214 may determine whether the message-based approach or the service flow-based approach is used to send the mobile-originated short burst message 438 to its ultimate destination.

The rules to determine whether the message-based approach or the service flow-based approach is used may be as follows. If the mobile-originated short burst message 438 needs encryption for data privacy, then the service flow-based approach may be used. If the mobile-originated short burst message 438 includes a large amount of data, then the service flow-based approach may be used. If the mobile-originated short burst message 438 requires a short delivery delay and low overhead, then the message-based approach may be used.

FIG. 5 illustrates how the MAC software 214 may send a mobile-originated short burst message 438 over a wireless communication network 218 using the message-based approach. When the MAC software 214 receives the mobile-originated short burst message 438 (e.g., via the MAC software API 216, as described above), the MAC software 214 may create a short burst message request 548. The short burst message request 548 is one of the new MAC messages that is described herein.

The short burst message request 548 may include various parameters, such as the message type 534 (e.g., SMS, IM, MMS, SIP, etc.), the message encoding type 550 (ASCII, bitmap, etc.), the message size 552, and the message body 546. The mobile-originated short burst message 438 may be included in the message body 546. The short burst message request 548 may then be sent to a base station 202.

FIG. 6 illustrates how the MAC software 214 may send a mobile-originated short burst message 438 over a wireless communication network 218 using the service flow-based approach. When the MAC software 214 on the mobile device 204 receives the mobile-originated short burst message 438 (e.g., via the MAC software API 216, as described above), the MAC software 214 may establish a short burst service flow 654. Other network components, such as the MAC software 656 on the base station 202, may also establish the short burst service flow 654. The mobile-originated short burst message 438 may then be sent to the base station 202 and other network components via the short burst service flow 654.

Additional information about a service flow in the context of a WiMAX network will now be provided. In a WiMAX network, a service flow is a unidirectional flow of packets with a particular set of QoS parameters and is identified by a service flow identifier (SFID). The QoS parameters could include traffic priority, maximum sustained traffic rate, maximum burst rate, minimum tolerable rate, scheduling type, ARQ type, maximum delay, tolerated jitter, service data unit type and size, bandwidth request mechanism to be used, transmission PDU formation rules, etc. Service flows may be provisioned through a network management system or created dynamically through signaling mechanisms that are defined in WiMAX standards.

The different types of service flows that are presently defined for WiMAX networks include unsolicited grant services (UGS) service flows, extended-real-time variable rate (ERT-VR) service flows, real-time variable rate (RT-VR) service flows, non-real-time variable rate (NRT-VR) service flows, and best effort (BE) service flows. The UGS service flows, ERT-VR service flows, RT-VR service flows, NRT-VR service flows, and BE service flows are currently defined in WiMAX standards.

The UGS service flows are designed to support fixed-size data packets at a constant bit rate. Examples of applications that may use this service are T1/E1 emulation and voice-over-IP (VoIP) without silence suppression. The NRT-VR service flows are designed to support real-time applications, such as VoIP with silence suppression, that have variable data rates but require guaranteed data rate and delay. The RT-VR service flows are designed to support real-time service flows, such as MPEG video, that generate variable-size data packets on a periodic basis. The NRT-VR service flows are designed to support delay-tolerant data streams, such as FTP, that require variable-size data grants at a minimum guaranteed rate. The BE service flows are designed to support data streams, such as Web browsing, that do not require a minimum service-level guarantee.

The service flow-based approach can use the existing service flow type in WiMAX, such as NRT-VR (Non-Real-Time-Variable Rate), if the delay of sending the short burst messages 438 is not a concern. In this type of service flow, the QoS parameters can include the Maximum Sustained Traffic Rate, the Minimum Reserved Traffic Rate, etc. If there is some concern about delay, RT-VR (Real-Time-Variable Rate) can be used, in which the Maximum Latency and bandwidth parameters may be provided. The Maximum Latency may depend on the delay requirement for sending short burst messages 438. The Maximum Sustained Traffic Rate and the Minimum Reserved Traffic Rate are typically small values, such as a few kilobits per second (kbps).

The service flow-based approach can also use a new type of service flow that is not currently defined in WiMAX standards. This new service flow type can be specifically for defining the QoS parameters for the short burst service flow described herein.

Figure 7:
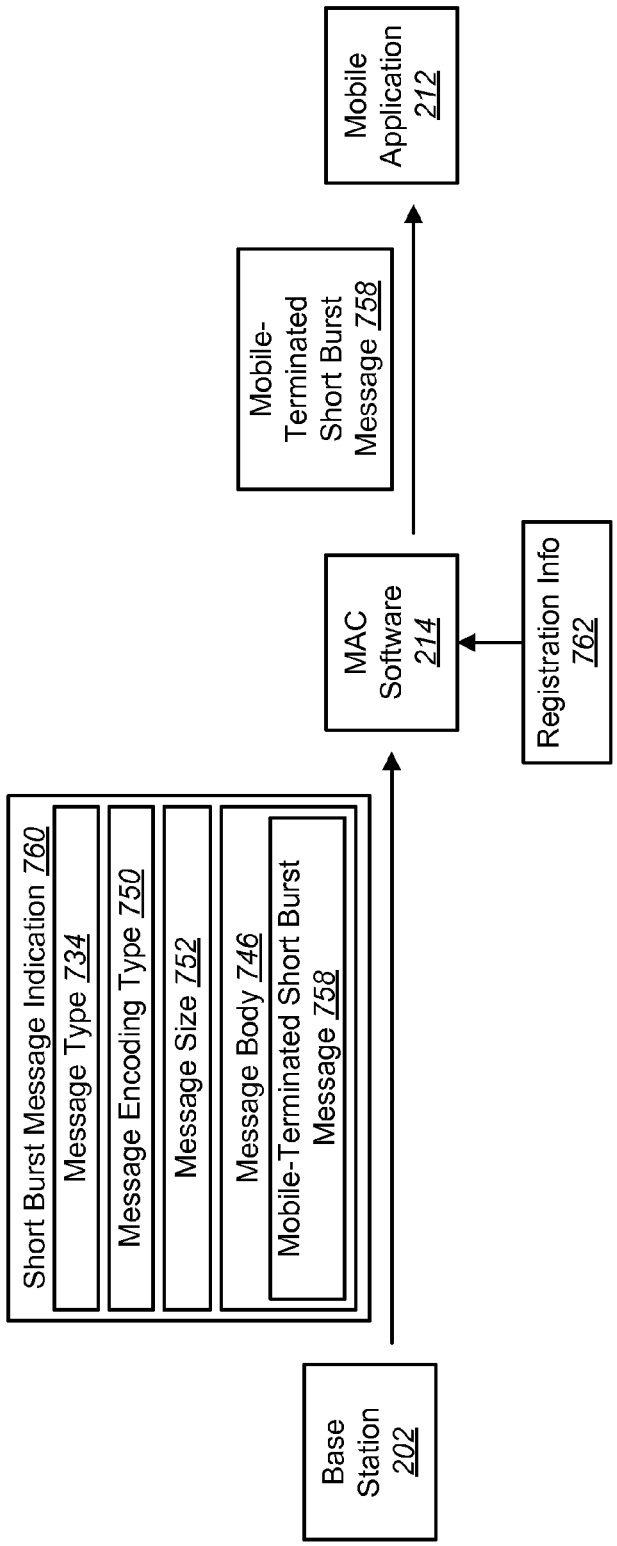
FIG. 7 illustrates how the MAC software may forward a mobile-terminated short burst message to an intended mobile application on the mobile device.

FIG. 7 illustrates how the MAC software 214 may forward a mobile-terminated short burst message 758 to an intended mobile application 212 on the mobile device 204. The MAC software 214 may receive the mobile-terminated short burst message 758 using the message-based approach or the service flow-based approach. The message-based approach is shown in FIG. 7.

The MAC software 214 on the mobile device 204 may receive a short burst message indication 760 from the base station 202. The short burst message indication 760 may include parameters that are similar to the short burst message request 548 described earlier, including the message type 734, the message encoding type 750, the message size 752, and the message body 746. The mobile-terminated short burst message 758 may be included in the message body 746.

Upon receiving the short burst message indication 760, the MAC software 214 may look up registration information 762 to determine which mobile application 212 should receive the mobile-terminated short burst message 758. The registration information 762 may include the information that is received from applications 212 when they register with the MAC software 214, including the callback information 336. The MAC software 214 may then forward the mobile-terminated short burst message 758 to the appropriate application 212. The MAC software 214 may send the mobile-terminated short burst message 758 to the application 212 via the MAC software API 216 (although this is not shown in FIG. 7).

Figure 8:
FIG. 8 illustrates a short burst message that is encapsulated by an encapsulation mechanism.

FIG. 8 illustrates a short burst message 864 that is encapsulated by an encapsulation mechanism 866. The short burst message 864 may be a mobile-originated short burst message 438 or a mobile-terminated short burst message 758. The encapsulation mechanism 866 may be a protocol data unit (PDU), a bitmap, text, etc.

Encapsulation may be performed for either the message-based approach or the service flow-based approach. If the message-based approach is used, encapsulation may be performed to put the short burst message 864 in the payload of the WiMAX MAC management message. If the service flow-based approach is used, encapsulation may be performed to put the short burst message 864 in the payload of the IP packet as the payload of the WiMAX MAC PDU.

An SMS message is an example of a short burst message 864 that may be encapsulated. The following are examples of different SMS message types 434:

SMS-DELIVER: sending a short message from the Service Center (SC) to the mobile device;
SMS-DELIVER-REPORT: replying with an error cause;
SMS-SUBMIT: sending a short message from the mobile device to the SC;
SMS-SUBMIT-REPORT: replying with an error cause;
SMS-STATUS-REPORT: sending a status report from the SC to the mobile device; and
SMS-COMMAND: sending a command from the mobile device to the SC.

Each of these types of SMS messages may be encapsulated by an encapsulation mechanism 866 (e.g., PDU, bitmap, text, etc.) as shown in FIG. 8.

FIG. 9 illustrates a method 900 for supporting short burst messages 864 over wireless communication networks 218. The method 900 may be implemented by the MAC software 214 on a mobile device 204.

The MAC software 214 may accept 902 registration of mobile applications 212 for sending and receiving short burst messages 864. The mobile applications 212 may be short burst applications, such as an SMS client, an IM client, an MMS client, an SIP client, etc. As indicated above, a mobile application 212 may register with the MAC software 214 by calling the registration function 330 that is defined in the MAC software API 216.

The MAC software 214 may receive 904 mobile-originated short burst messages 438 from registered mobile applications 212. The mobile-originated short burst messages 438 may originate from a mobile application 212 (e.g., an SMS client, an IM client, an MMS client, an SIP client, etc.) on the mobile device 204. The mobile-originated short burst messages 438 may be received via the MAC software API 216 in the manner described above.

The MAC software 214 may also send 906 mobile-originated short burst messages 438 over the wireless communication network 218. The message-based approach described herein and/or the service flow-based approach described herein may be used to send the mobile-originated short burst messages 438. The MAC software 214 may determine whether the message-based approach or the service flow-based approach should be used. To send 906 a mobile-originated short burst message 438 using the message-based approach, the MAC software 214 may create a short burst message request 548 that includes the mobile-originated short burst message 438, and send the short burst message request 548 to a base station 202. To send a mobile-originated short burst message 438 using the service flow-based approach, the MAC software 214 may establish a short burst service flow 654, and send the mobile-originated short burst message 438 via the short burst service flow 654.

The MAC software 214 may also forward 908 mobile-terminated short burst messages 758 to intended mobile applications 212 on the mobile device 204. The mobile-terminated short burst messages 758 may be destined for a mobile application 212 on the mobile device 204. The mobile-terminated short burst messages 758 may be received from a base station 202. The mobile-terminated short burst messages 758 may be received using the message-based approach or the service flow-based approach. If the message-based approach is used, then a mobile-terminated short burst message 758 may be included in a short burst message indication 760 that is received by the MAC software 214. If the service flow-based approach is used, then a mobile-terminated short burst message 758 may be received via a short burst service flow 654 that was previously established.

The method 900 of FIG. 9 described above may be performed by various hardware and/or software component(s) and/or module(s) corresponding to the means-plus-function blocks 1000 illustrated in FIG. 10. In other words, blocks 902 through 908 illustrated in FIG. 9 correspond to means-plus-function blocks 1002 through 1008 illustrated in FIG. 10. Thus, FIG. 10 illustrates an apparatus 1000 for supporting short burst messages 864 over wireless communication networks 218.

Figure 11:
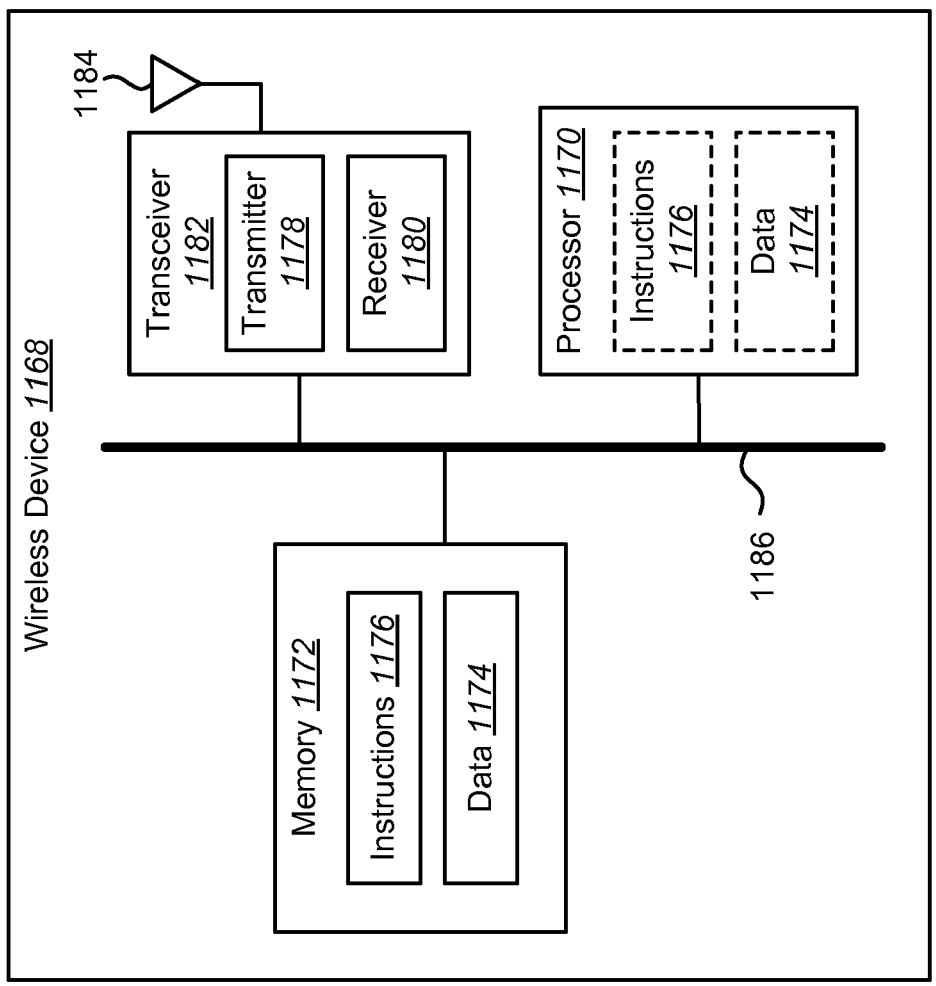
FIG. 11 illustrates certain components that may be included within a wireless device that is configured in accordance with the present disclosure.

Reference is now made to FIG. 11. FIG. 11 illustrates certain components that may be included within a wireless device 1168 that is configured in accordance with the present disclosure. The wireless device 1168 may be a mobile device or a base station.

The wireless device 1168 includes a processor 1170. The processor 1170 may be a general purpose single- or multi-chip microprocessor (e.g., an ARM), a special purpose microprocessor (e.g., a digital signal processor (DSP)), a microcontroller, a programmable gate array, etc. The processor 1170 may be referred to as a central processing unit (CPU). Although just a single processor 1170 is shown in the wireless device 1168 of FIG. 11, in an alternative configuration, a combination of processors (e.g., an ARM and DSP) could be used.

The wireless device 1168 also includes memory 1172. The memory 1172 may be any electronic component capable of storing electronic information. The memory 1172 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1174 and instructions 1176 may be stored in the memory 1172. The instructions 1176 may be executable by the processor 1170 to implement the methods disclosed herein. Executing the instructions 1176 may involve the use of the data 1174 that is stored in the memory 1172.

The wireless device 1168 may also include a transmitter 1178 and a receiver 1180 to allow transmission and reception of signals between the wireless device 1168 and a remote location. The transmitter 1178 and receiver 1180 may be collectively referred to as a transceiver 1182. An antenna 1184 may be electrically coupled to the transceiver 1182. The wireless device 1168 may also include (not shown) multiple transmitters, multiple receivers, multiple transceivers and/or multiple antenna.

The various components of the wireless device 1168 may be coupled together by one or more buses, which may include a power bus, a control signal bus, a status signal bus, a data bus, etc. For the sake of clarity, the various buses are illustrated in FIG. 11 as a bus system 1186.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements. The terms "instructions" and "code" may be used interchangeably herein.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 9, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for supporting short burst messages, the method being implemented by a mobile device, the method comprising:
   - determining whether mobile-originated short burst messages should be sent using a message-based approach or a service flow-based approach;
   - sending the mobile-originated short burst messages using at least one of the message-based approach and the service flow-based approach;
      - wherein sending the mobile-originated short burst message using the message-based approach comprises creating a short burst message request and sending the short burst message request to a base station;
      - wherein the short burst message request comprises a message type, a message encoding type, a message size, and a message body; and
   - receiving mobile-terminated short burst messages using at least one of the message-based approach and the service flow-based approach.

2. The method of claim 1, wherein sending a mobile-originated short burst message using the service flow-based approach comprises:
  establishing a short burst service flow; and
  sending the mobile-originated short burst message via the short burst service flow;
  wherein the short burst service flow has a quality of service that is specifically defined for short burst messages.

3. The method of claim 1, wherein the short burst messages comprise at least one of Short Message Service (SMS) messages, Instant Messages, Multimedia Messaging Service (MMS) messages, and Session Initiation Protocol (SIP) messages.

4. The method of claim 1, further comprising accepting registration of mobile applications for sending and receiving the short burst messages, wherein the registration of the mobile applications is received via a media access control (MAC) software application programming interface (API).

5. The method of claim 1, further comprising receiving the mobile-originated short burst messages via a media access control (MAC) software application programming interface (API).

6. The method of claim 1, wherein the short burst messages are encapsulated within at least one of a protocol data unit (PDU), a bitmap, and text.

7. A method for supporting short burst messages, the method being implemented by a mobile device, the method comprising:
  determining whether mobile-originated short burst messages should be sent using a message-based approach or a service flow-based approach;
  sending the mobile-originated short burst messages using at least one of the message-based approach and the service flow-based approach; and
  receiving mobile-terminated short burst messages using at least one of the message-based approach and the service flow-based approach, wherein receiving a mobile-terminated short burst message using the message-based approach comprises receiving a short burst message indication from a base station, the short burst message indication comprises a message type, a message encoding type, a message size, and a message body.

8. A mobile device configured for supporting short burst messages, comprising:
  a processor;
  memory in electronic communication with the processor;
  instructions stored in the memory, the instructions being executable by the processor to:
    determine whether mobile-originated short burst messages should be sent using a message-based approach or a service flow-based approach;
    send the mobile-originated short burst messages using at least one of the message-based approach and the service flow-based approach, wherein sending comprises creating a short burst message request having a message type, a message encoding type, a message size, and a message body, and sending the short burst message request to a base station; and
    receive mobile-terminated short burst messages using at least one of the message-based approach and the service flow-based approach.

9. The mobile device of claim 8, wherein receiving a mobile-terminated short burst message using the message-based approach comprises receiving a short burst message indication from a base station.

10. The mobile device of claim 9, wherein the short burst message indication comprises a message type, a message encoding type, a message size, and a message body.

11. The mobile device of claim 8, wherein sending a mobile-originated short burst message using the service flow-based approach comprises:
  establishing a short burst service flow; and
  sending the mobile-originated short burst message via the short burst service flow;
  wherein the short burst service flow has a quality of service that is specifically defined for short burst messages.

12. The mobile device of claim 8, wherein the short burst messages comprise at least one of Short Message Service (SMS) messages, Instant Messages, Multimedia Messaging Service (MMS) messages, and Session Initiation Protocol (SIP) messages.

13. The mobile device of claim 8, wherein the instructions are further executable to accept registration of mobile applications for sending and receiving the short burst messages, wherein the registration of the mobile applications is received via a media access control (MAC) software application programming interface (API).

14. The mobile device of claim 8, wherein the instructions are further executable to receive the mobile-originated short burst messages via a media access control (MAC) software application programming interface (API).

15. The mobile device of claim 8, wherein the short burst messages are encapsulated within at least one of a protocol data unit (PDU), a bitmap, and text.

16. A mobile device configured for supporting short burst messages, comprising:
  means for determining whether mobile-originated short burst messages should be sent using a message-based approach or a service flow-based approach;
  means for sending the mobile-originated short burst messages using at least one of the message-based approach and the service flow-based approach, wherein means for sending comprises means for creating a short burst message request having a message type, a message encoding type, a message size, and a message body, and sending the short burst message request to a base station; and
  means for receiving mobile-terminated short burst messages using at least one of the message-based approach and the service flow-based approach.

17. The mobile device of claim 16, wherein the means for receiving a mobile-terminated short burst message using the message-based approach comprises means for receiving a short burst message indication from a base station.

18. The mobile device of claim 16, wherein the means for sending a mobile-originated short burst message using the service flow-based approach comprises:
  means for establishing a short burst service flow; and
  means for sending the mobile-originated short burst message via the short burst service flow;
  wherein the short burst service flow has a quality of service that is specifically defined for short burst messages.

19. The mobile device of claim 16, wherein the short burst messages comprise at least one of Short Message Service (SMS) messages, Instant Messages, Multimedia Messaging Service (MMS) messages, and Session Initiation Protocol (SIP) messages.

20. The mobile device of claim 16, further comprising means for accepting registration of mobile applications for sending and receiving the short burst messages, wherein the registration of the mobile applications is received via a media access control (MAC) software application programming interface (API).

21. The mobile device of claim 16, further comprising means for receiving the mobile-originated short burst messages via a media access control (MAC) software application programming interface (API).

22. The mobile device of claim 16, wherein the short burst messages are encapsulated within at least one of a protocol data unit (PDU), a bitmap, and text.

23. A computer-program product for facilitating support for short burst messages by a mobile device, the computer-program product comprising a computer-readable medium having instructions thereon, the instructions comprising:
   code for determining whether mobile-originated short burst messages should be sent using a message-based approach or a service flow-based approach;
   code for sending the mobile-originated short burst messages using at least one of the message-based approach and the service flow-based approach, wherein code for sending comprises code for creating a short burst message request, the short burst message request having a message type, a message encoding type, a message size, and a message body, and sending the short burst message request to a base station; and
   code for receiving mobile-terminated short burst messages using at least one of the message-based approach and the service flow-based approach.

24. The computer-program product of claim 23, wherein the code for receiving a mobile-terminated short burst message using the message-based approach comprises code for receiving a short burst message indication from a base station.

25. The computer-program product of claim 23, wherein the code for sending a mobile-originated short burst message using the service flow-based approach comprises:
   code for establishing a short burst service flow; and
   code for sending the mobile-originated short burst message via the short burst service flow;
   wherein the short burst service flow has a quality of service that is specifically defined for short burst messages.

* * * * *